United States Patent [19]

Schneiderman

[11] Patent Number: 5,203,703
[45] Date of Patent: Apr. 20, 1993

[54] DEGLUTITION TRAINING METHOD AND APPARATUS

[76] Inventor: Marc J. Schneiderman, 135 Claridge Dr., Coraopolis, Pa. 15108

[21] Appl. No.: 750,456

[22] Filed: Aug. 27, 1991

[51] Int. Cl.$^5$ .................. G09B 19/00; B65D 83/04
[52] U.S. Cl. ........................ 434/127; 434/236; 434/258; 434/433; 206/531; 206/534
[58] Field of Search ............ 434/433, 238, 236, 258, 434/262, 127; 206/828, 528, 531, 532, 534; 128/897, 898

[56] References Cited

U.S. PATENT DOCUMENTS

| | | |
|---|---|---|
| 625,757 | 5/1989 | Groneman . |
| 3,302,776 | 2/1967 | Sparks . |
| 3,743,084 | 7/1973 | Douglas . |
| 3,933,245 | 1/1976 | Mullen .......................... 206/532 |
| 4,340,141 | 7/1982 | Fischer . |
| 4,717,343 | 1/1988 | Densky . |
| 4,736,849 | 4/1988 | Leonard et al. .............. 206/534 |
| 4,889,238 | 12/1989 | Batchelor . |

FOREIGN PATENT DOCUMENTS

| | | | |
|---|---|---|---|
| 2840858 | 4/1980 | Fed. Rep. of Germany | 206/528 |
| 2169263 | 7/1986 | United Kingdom | 206/828 |

Primary Examiner—Richard J. Apley
Assistant Examiner—Karen Ann Jalbert
Attorney, Agent, or Firm—Webb, Burden, Ziesenheim & Webb

[57] ABSTRACT

A method of teaching pill swallowing by initially administering very small, usually hollow, pills and increasing the pill size gradually during the learning period. The learning period is ordinarily a period of days. Such a method is effective as a result of success-oriented positive reinforcement. A teaching kit for facilitated learning is also disclosed.

12 Claims, 1 Drawing Sheet

DEGLUTITION TRAINING METHOD AND APPARATUS

FIELD OF THE INVENTION

The invention pertains to swallowing, and more particularly to the teaching of, or to the rehabilitation of, the ability to swallow pills.

BACKGROUND OF THE INVENTION

Among the various skills which children gradually learn, including grooming, dressing and feeding themselves, one which many children have trouble with is pill-swallowing, or the swallowing of a pharmaceutical oral dosage form which cannot or should not be chewed. Not surprisingly, in view of the difficulty of learning this skill, there are adults who likewise have the same difficulty with swallowing. Medical practitioners often find that some adult patients never in all their lives learned to swallow pills. In addition, adults not infrequently need to re-learn how to swallow pills, for a number of reasons including but not limited to physiologic changes, including oral mucosa or palate disorders, or even simply from the loss of the skill through lack of practice. As a result, a surprising number of individuals including both children and adults have such difficulty taking medication by swallowing a pill that they refuse—sometimes vehemently—even to try.

There is a known method of pill swallowing in which a quantity of liquid is taken into the mouth together with the pill, the head is inclined forward so that the pill floats on the surface of the liquid held in the mouth, and the pill is then swallowed. It is not known how many individuals actually practice this method of swallowing a pill. Some individuals lean their heads backwards when taking pills, while others keep their heads in an untilted orientation. The fact that particular methods for swallowing pills are known, however, does not address the ubiquitous problem that individuals often never have an opportunity to learn or to practice how to swallow a pill, regardless of the swallowing method used.

Methods and auxiliary aids for actually teaching pill swallowing, or deglutition in general, have not previously been developed. A need thus remains for a method well-suited for teaching deglutition in a simple and direct way. Development of an aid or kit for implementing such a teaching method would provide significant assistance in carrying out such a method.

BRIEF DESCRIPTION OF THE INVENTION

In order to meet this need, I have developed a method of teaching pill swallowing by initially administering very small, usually hollow, pills and increasing the pill size gradually during a multiple day learning period. Such a method is effective as a result of success-oriented positive reinforcement. Usually, two pills (placebos) of the same size are administered each day, one at a time, with praise or other positive reinforcement, and then nothing further is done until the next day when somewhat larger pills are swallowed. Preferably, the pills administered during the early days of the teaching method are so hollow, and are made of a material which is so water soluble, that when the student places the pill on the tongue and drinks some water, the pill dissolves. This pill dissolution may give the impression that the pill was actually swallowed but in any event provides an immediate positive swallowing experience. In subsequent days, the pill size is increased and the pills are more filled so that ultimately a full-size, solid pill can be swallowed without either anxiety or physical difficulty. Most preferably, the pills are round, the first pill in the series has a diameter of about 1 mm, the last pill has a diameter of about 1 cm, and the teaching method is implemented over a period of about 8 days.

DETAILED DESCRIPTION OF THE INVENTION

As described above, the present invention is a method—based upon success-oriented positive reinforcement—of teaching (or learning) pill swallowing. Early learning is accomplished by the attempted swallowing of very small, usually hollow, pills and by subsequently increasing pill size gradually. Usually, two pills of the same size are administered each day, one at a time and with positive reinforcement each time. The learning period extends over a period of days.

Preferably, the pills administered during the early days of the teaching method are hollow and soluble, so that when the individual attempting to swallow it places it on the tongue, and then drinks some water, the pill substantially if not completely dissolves. This pill dissolution can give the impression that the pill was actually swallowed; in any event the small, hollow pills are extremely easy to swallow and therefore provide an immediate positive swallowing experience with which to begin the learning program. However, the invention also comprehends the method of teaching pill swallowing by using very small, solid pills to start. In the subsequent lessons in the program, for all embodiments of the invention, the pill size increases and the pills become more filled (if necessary) so that ultimately a full-size, solid pill can be swallowed with ease.

In the most preferred embodiment of the invention, each of the first two pills in a series of fifteen round pills has a diameter of about 1 mm, with each set of two pills thereafter increasing gradually in size except for the fifteenth pill which is the largest, approximately 1 cm in diameter. The single, largest pill is swallowed on the last day of the program. In an alternate embodiment of the invention, capsule-shaped pills are used for teaching swallowing. For every two capsule-sized pills, in sequence, the size of the capsule-shaped pills increases. The smallest capsule is approximately 2 mm in length, and the largest capsule is about 2 cm in length. The two same-size pills are administered, separately, in a teaching session each day for a consecutive period of 7 days, so that deglutition training takes place gradually by positive reinforcement. On the eighth day, the fullsize capsule can be easily swallowed.

Figure 1:
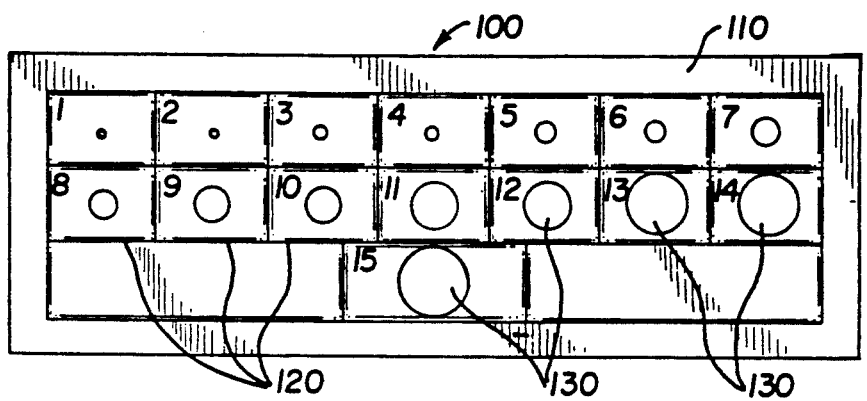
FIG. 1 is a top, plan view of a bubble-pak, for optional insertion in a standard pharmaceutical dispenser case, which contains a series of 15 round pills according to a first embodiment of the invention.

The most preferred embodiment of the invention may be implemented readily by use of the kit as shown in FIG. 1. FIG. 1 illustrates a bubble-pak 100, having a bubble-pak backing 110 known in the art, and which includes fifteen numbered pill compartments 120, each of which contains the incrementally-by-two sized placebos 130. (For the purpose of this disclosure, the "pills" disclosed are preferably "placebos," strictly speaking, because they contain no pharmaceutically active agent and may or may not have a candy composition. However, "placebo" does comprehend vitamins, minerals, food supplements and other substances, although ordinarily no pharmaceutically active agents. In fact, for the purpose of this disclosure, the word "pill" means a swallowable particulate construct.) As is customary in bubble-pak packaging, the placebos 130 are contained within numbered pill compartments 120 which have a strong, transparent plastic surface opposing a tearable foil surface; this aspect of bubble-pak design is well-known in the art of pharmaceutical packaging and needs no further elaboration. The shape of the bubble-pak may be varied so as to include art work or figures that can be appreciated by a child.

As an individual practices swallowing according to the present method by using the bubble-pak of FIG. 1, regardless of whether the bubble-pak 100 is in a standard pharmaceutical dispenser case or not, the individual presses the placebo 130 from the compartment numbered "1", places the placebo in the mouth, drinks some water and "swallows" the placebo. When the placebo contained in the compartment 120 numbered "1" is constructed of a hollow, highly water soluble material such as dextrose, the placebo readily dissolves in the mouth. Alternatively, the placebo in the compartment 120 numbered "1" may be solid and need not be water-soluble as long as it is constructed of food-grade if not pharmaceutical-grade materials. Water-soluble materials suitable for use in preparing the placebos 130 include suitable for use in preparing the placebos 130 include sugars such as sucrose, dextrose, maltose, mannose and lactose. Generally speaking, widely-available inexpensive pharmaceutical excipients including carboxymethyl cellulose, carboxypropylmethyl cellulose, polyvinyl alcohol, waxes, starch, bone meal, alkaline earth metal salts, mineral salts, mineral particulates and other natural and synthetic polymer materials, are also suitable for use in preparing the placebos 130.

If learning, together with the bubble-pak 100, proceeds without the aid of a teacher, the individual experiences positive reinforcement simply by the act of swallowing the placebo 130 taken from the compartment numbered "1". If a teacher is present, the teacher should provide additional positive reinforcement by pointing out that successful pill-swallowing has occurred and that the task was completed well, together with other suitable recognition and encouragement. On the same day, the placebo 130 from the compartment numbered "2" should be administered and swallowed in the same way as the first. Positive reinforcement—whether from the individual himself or from a teacher—should be repeated, whereupon the lesson is finished for that day. Two successful swallowing experiences per day for seven days are thus possible with the bubble-pak 100 of FIG. 1. On the eighth day, usually if not always the fifteenth placebo 130 from the compartment numbered "15" can be swallowed without difficulty.

Figure 2:
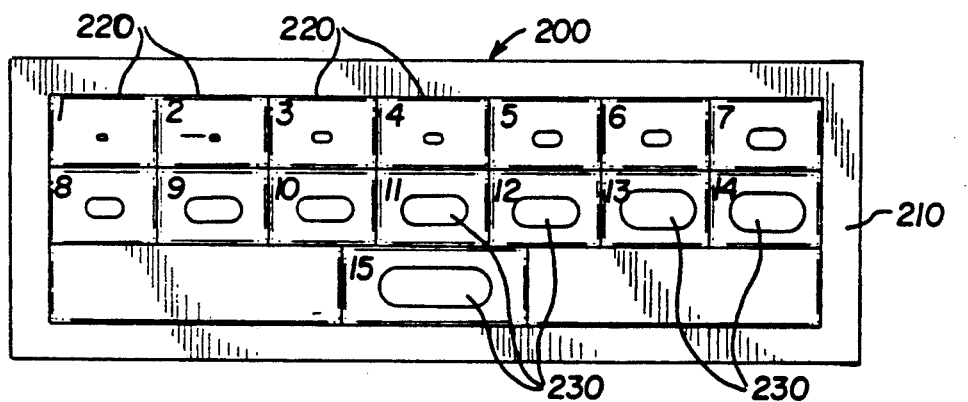
FIG. 2 is a top, plan view of a bubble-pak, similar to that shown in FIG. 1, which includes 15 capsule-shaped pills.

An alternate embodiment of the invention appears in FIG. 2. FIG. 2 illustrates a bubble-pak 200 having a bubble-pak backing 210 supporting numbered pill compartments 220 which contain the individual placebos 230. In this embodiment of the invention, the placebos are not round as shown in FIG. 1, but are configured in the conventional elongated "capsule" shape. This embodiment of the invention is particularly useful for teaching capsule-swallowing after pill-swallowing has been learned according to the most preferred embodiment of the invention (FIG. 1). In other words, after basic pill-swallowing is learned, the learning is reinforced and the skills learned are improved by the patient's having to overcome any remaining reluctance to swallow pills if they are capsule-shaped. The placebos 230 of FIG. 2 may be constructed, in like manner as the placebos 130 of FIG. 1, of literally any food-grade if not pharmaceutical-grade constituent including sugars and polymers.

After reference is made to the above disclosure, variations on the concept of the invention will be readily apparent to those skilled in the art. Pill or placebo size may increase with each pill in a series. The teaching technique may be conducted over a shorter or longer period of time, although usually the invention will not be practiced over a period shorter than three days or longer than 30 days or at most 40 days, or with fewer than 5 or with more than 27 pills. Other shapes of pills or placebos may be used, particularly for advanced deglutition training. Learning sessions may occur every other day instead of every day. Surface textures of the series of pills or placebos may become increasingly rough as the pill size increases, to enhance both the challenge and the accomplishment of easy swallowing of such constructs. The method need not be conducted by means of use of a bubble-pak or kit at all; literally any means of administering pills of incrementally increasing sizes comes within the scope of the present invention. Depending on the age of the individual involved in the learning experience, it is in some cases better to administer less soluble pills (such as those made of carboxymethyl cellulose) rather than those made of sugar, to discourage chewing of sugar pills by youngsters as if they were candy. Pill or placebo composition likewise may change throughout the range of pill sizes in a given set or sequence of pills.

Having described above the presently preferred embodiments of this invention, it is to be understood that it may be otherwise embodied within the scope of the appended claims.

I claim:

1. A success-oriented positive reinforcement method for teaching pill-swallowing, to enable a person to swallow a predetermined full-sized pill or capsule utilizing a set of incrementally increasing swallowable particulate constructs and at least one full-sized swallowable particulate construct, said method comprising the steps of, in sequence, a) administering a first swallowable particulate construct to a person for whom deglutition training is desired;

b) motivating said person to swallow said first swallowable particulate construct without chewing it;

c) positively reinforcing the success of the swallowing of step b);

d) administering to said person a second swallowable particulate construct of the same size as the first swallowable particulate construct and on the same day as the first swallowable particulate construct was administered;

e) motivating said person to swallow said second swallowable particulate construct without chewing it;

f) positively reinforcing the success of the swallowing of step e); and g) repeating steps a)-f) between 3 and 40 times at a periodicity between every other day and every day, wherein each repetition of steps a)-f) further comprises the administration of a first and second swallowable particulate construct each having the same size as the other and each further having a size larger than the first and second swallowable particulate constructs administered in a previous sequence of steps a)-f); and h) administering at least one full-sized swallowable particulate construct to said person for whom deglutition training is desired, said at least one full-sized swallowable particulate construct representing a full-sized pill or capsule;

i) motivating said person to swallow said at least one full-sized swallowable particulate construct without chewing it; and j) positively reinforcing the success of the swallowing of step i).

2. The method according to claim 1 wherein steps a)-f) are repeated with a periodicity of every day.

3. The method according to claim 2 wherein steps a)-f) are repeated each day for 30 days.

4. The method according to claim 2 wherein steps a)-f) are repeated each day for a period of seven days and steps h)-j) are performed on the eighth day and further wherein said first and second swallowable particulate constructs are pills which increase in size from 1 mm., during the first execution of steps a)-f), to 1 cm., during the eighth and final steps h)-j).

5. The method according to claim 2 wherein steps a)-f) are repeated each day for a period of seven days and steps h)-j) are performed on the eighth day and further wherein said first and second swallowable particulate constructs are capsules which increase in size from 2 mm., during the first execution of steps a)-f), to 2 cm., during the eighth and final steps h)-i).

6. The method according to claim 2 wherein said first and second swallowable particulate constructs are hollow during the first execution of steps a)-f) and are solid during the final steps h)-j).

7. A pre-packaged kit for assisting in the teaching or learning of pillow swallowing comprising:
   a) a package; and
   b) at least two groups of swallowable particulate constructs contained within said package, each said group having two equally sized constructs, said at least two groups incrementally increasing in size from one group to the next; and
   c) at least one predetermined full-sized swallowable particulate construct contained within said package having a size greater than all previous constructs in said at least two groups of swallowable particulate constructs.

8. The pre-packaged kit according to claim 7 wherein said swallowable particulate constructs are pills and further wherein said kit contains 15 pills.

9. The pre-packaged kit according to claim 8 wherein said pills are placebos and further wherein said pills contain no pharmaceutically active agent.

10. The pre-packaged kit according to claim 9 wherein said package is a bubble-pak having a bubble-pak backing and numbered pill compartments containing said pills individually.

11. The pre-packaged kit according to claim 10 wherein said pills are round.

12. The pre-packaged kit according to claim 10 wherein said pills contain constituents selected from the group consisting of sucrose, dextrose, maltose, mannose, lactose, carboxymethyl cellulose, carboxypropylmethyl cellulose, polyvinyl alcohol, wax, starch, bone meal alkaline earth metal salt, mineral salt and mineral particulate.

* * * * *